Jan. 27, 1970   H. LAMM   3,491,729
ROTARY PISTON INTERNAL COMBUSTION ENGINE
Filed May 11, 1967
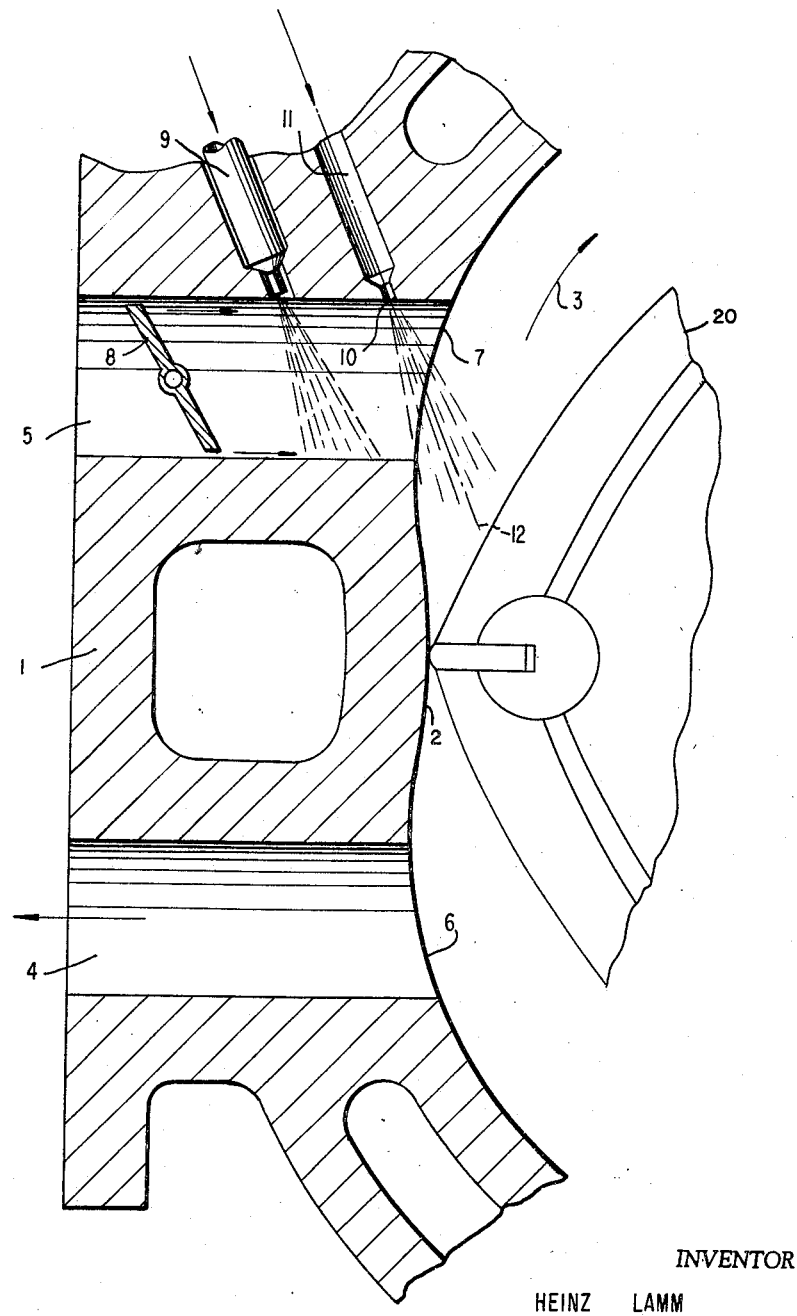
INVENTOR
HEINZ LAMM
BY
ATTORNEYS

United States Patent Office 3,491,729
Patented Jan. 27, 1970

3,491,729
ROTARY PISTON INTERNAL COMBUSTION ENGINE
Heinz Lamm, Esslingen-St. Bernhardt, Germany, assignor to Daimler-Benz Aktiengesellschaft, Stuttgart-Unterturkheim, Germany
Filed May 11, 1967, Ser. No. 637,736
Claims priority, application Germany, May 13, 1966, D 50,110
Int. Cl. F02b 53/10, 55/14, 55/16
U.S. Cl. 123—8                              12 Claims

ABSTRACT OF THE DISCLOSURE

A rotary piston internal combustion engine, especially of trochoidal construction, which has a housing case provided with a bearing surface for the piston corners of a polygonal piston, and which includes an inlet channel for the flow of combustion air, whose control aperture is located in the bearing surface for the piston; the housing case is further provided with a bore for the injection of air or fuel-air mixture whose discharge orifice terminates in the inlet channel.

Background of the invention

The present invention relates to a rotary piston internal combustion engine, especially of trochoidal construction, provided with an inlet channel arranged within the housing case whose control aperture is disposed in the bearing surface for the piston, and provided with a bore in the housing case within the area of the inlet channel through which air or fuel-air mixture is injected into the internal combustion engine.

Bores for the injection of air or fuel-air mixture for purposes of producing an air barrier between the inlet and outlet channels are arranged in the prior art in rotary piston internal combustion engines of trochoidal construction in such a manner that the apertures of these bores are disposed within the bearing surface or cam track for the piston arranged in the housing case. These arrangements of the prior art, however, are unfavorable because gas losses occur during the sweep over the orifices of these bores by the sealing bars arranged in the piston corners.

Summary of the invention

The present invention aims at avoiding such gas losses, and in solution to the underlying problems essentially consists in that the discharge aperture or orifice of the bore for the injection of air or fuel-air mixture is located in the inlet channel.

By the arrangement of the injection bore according to the present invention one avoids any bore located in the bearing surface or cam track for the piston with the injection of additional air. With the injection of air or mixture out of the compression chamber of the internal combustion engine only one bore remains in the bearing surface of the housing case. Furthermore, one achieves by the present invention that the barrier against the passage of exhaust gases to the suction side of the internal combustion engine, produced by means of the injected air or the injected mixture, is moved close to the outlet channel.

According to a further feature and development of the present invention, the discharge aperture or orifice of the bore in the inlet channel may be arranged near the cam track or bearing surface for the piston. Furthermore, the bore may be so arranged that the injection takes place opposite the direction of rotation of the piston.

A contribution to the mixture formation is realized by this arrangement in conjunction with the combustion air flowing through the inlet channel and possibly with the fuel injection into the inlet channel between the throttle valve and the orifice or discharge aperture of the injection bore because intensive mixing and eddying take place.

Accordingly, it is an object of the present invention to provide a rotary piston internal combustion engine which avoids by simple means the aforementioned shortcomings and drawbacks encountered with the prior art constructions.

Another object of the present invention resides in a rotary piston internal combustion engine provided with injection means to prevent the overflow of exhaust gases into the suction side of the engine which minimizes gas losses caused by discharge apertures or the like located within the bearing surface of the piston.

A further object of the present invention resides in a rotary piston internal combustion engine of the type described above which obviates the discharge apertures in the bearing surface or cam track of the piston for the injection of air or fuel-air mixture intended to prevent the flow of exhaust gases into the suction space of the engine.

Still another object of the present invention resides in a rotary piston internal combustion engine in which not only all of the aforementioned aims and objects are realized in a particularly favorable manner, but also the mixture formation is enhanced by more intensive mixing and vortexing.

These and further objects, features and advantages of the present invention will become more obvious from the following description when taken in connection with the accompanying drawing which shows, for purposes of illustration only, one embodiment in accordance with the present invention, and wherein:

The single figure is a partial cross-sectional view through the housing case of a rotary piston internal combustion engine in accordance with the present invention.

Referring now to the single figure of the drawing, reference numeral 1 designates therein a conventional housing case provided with a bearing surface or cam track 2 for the polygonal piston 20 of the internal combustion engine which rotates in the direction of arrow 3. The outlet channel 4 and the inlet channel 5 are arranged in the housing case 1. The control apertures 6 and 7 of the two channels 4 and 5 are located in the bearing surface 2.

The throttle valve 8 of conventional construction is arranged in the inlet channel 5. Furthermore, the injection nozzle 9 for the injection of fuel (gasoline) is so arranged at the housing case 1 that the orifice of the injection nozzle is disposed in the forward wall of the inlet channel 5, as viewed in the direction of rotation of the piston, between the throttle valve 8 and the control aperture 7, and the fuel is injected transversely across the air flowing through the inlet channel 5.

The orifice or discharge aperture 10 of the bore 11 which serves for the injection of air or fuel-air mixture is located in the wall of the inlet channel 5 between the injection nozzle 9 and the control aperture 7. The center longitudinal axis 12 of the bore 11 is so inclined opposite the direction of rotation of the piston as indicated by the arrow 3, that the injection takes place in a direction opposite the exhaust gases stemming from the expansion side of the internal combustion engine.

Gas losses are avoided by the arrangement in accordance with the present invention of the bore 11 at the inlet channel 5. It is also obvious that the injection into the inlet channel provides a favorable contribution to the mixture formation.

While I have shown and described only one embodiment in accordance with the present invention, it is obvious that the same is not limited thereto but is susceptible

I claim:

1. A rotary piston internal combustion engine, especially of trochoidal construction, comprising housing case means provided with internal bearing surface means for a piston, inlet and outlet channel means arranged in the housing case means on the same side of the housing case means, and having control aperture means located in said bearing surface means, and bore means provided in the housing case means near the bearing surface means for the piston and having discharge aperture means so located in the inlet channel means in such a direction for injecting at least air to provide an air barrier in the area between said inlet and outlet means.

2. A rotary piston internal combustion engine according to claim 1, wherein a mixture of fuel and air is injected through said bore means to provide said barrier.

3. A rotary piston internal combustion engine according to claim 1, further comprising fuel injection means for injecting fuel substantially transversely across the air flowing through the inlet channel means, said bore means being arranged in said housing case means between said injection means and the control aperture means.

4. A rotary piston internal combustion engine according to claim 3, wherein the discharge aperture means of said bore means is located in the forward wall portion of the inlet channel means, as viewed in the direction of rotation of the piston.

5. A rotary piston internal combustion engine according to claim 1, wherein the bore means is so located that the injection takes place opposite the direction of rotation of the piston.

6. A rotary piston internal combustion engine according to claim 1, wherein the discharge aperture means of said bore means is located in the forward wall portion of the inlet channel means, as viewed in the direction of rotation of the piston.

7. A rotary piston internal combustion engine according to claim 1, further comprising fuel injection means for injecting fuel substantially transversely across the air flowing through the inlet channel means, said bore means being arranged in said housing case means between said injection means and the control aperture means.

8. A rotary piston internal combustion engine according to claim 7, wherein the bore means is so located that the injection takes place opposite the direction of rotation of the piston.

9. A rotary piston internal combustion engine, especially of trochoidal construction, which includes a housing case provided with an inlet channel and with an outlet channel whose control apertures are located in the bearing surface of the housing case for the piston, and in which air is injected into the area between said inlet channel and said outlet channel to provide an air barrier preventing the escape of exhaust gases from the region of the outlet channel into the region of the inlet channel, wherein the improvement comprises bore means in the housing case within the area of the inlet channel for injecting said air barrier into said area through at least part of said inlet channel, and said bore means being provided with discharge aperture means terminating in said inlet channel.

10. The improvement according to claim 9, wherein the discharge aperture means of the bore means in the inlet channel is arranged near the bearing surface for the piston provided in the housing case.

11. The improvement according to claim 10, wherein the bore means is so arranged that the injection takes place opposite the direction of rotation of the piston.

12. The improvement according to claim 9, wherein the bore means is so arranged that the injection takes place opposite the direction of rotation of the piston.

References Cited

UNITED STATES PATENTS 3,255,738  6/1966  Springer et al. _____ 123—8

FOREIGN PATENTS 1,027,787  4/1966  Great Britain.
1,373,378  8/1964  France.

WILLIAM E. WAYNER, Primary Examiner